US010311361B1

(12) United States Patent
Durham et al.

(10) Patent No.: US 10,311,361 B1
(45) Date of Patent: Jun. 4, 2019

(54) MEDIA THEME PROPAGATION USING DECRETIZATION OF CONTINUOUS VARIABLES

(71) Applicant: Amazon Technologies, Inc., Reno, NV (US)

(72) Inventors: Brandon Scott Durham, Seattle, WA (US); Haowei Lu, Seattle, WA (US); Christopher Lon McGilliard, Seattle, WA (US); Darren Levi Malek, Seattle, WA (US); Joshua Fredrick Lutes, Seattle, WA (US); Toby Ray Latin-Stoermer, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 766 days.

(21) Appl. No.: 14/315,167

(22) Filed: Jun. 25, 2014

(51) Int. Cl.
  *G06N 5/04* (2006.01)
  *G06N 20/00* (2019.01)

(52) U.S. Cl.
  CPC ............... *G06N 5/04* (2013.01); *G06N 20/00* (2019.01)

(58) Field of Classification Search
  None
  See application file for complete search history.

(56) References Cited

U.S. PATENT DOCUMENTS

2005/0021489 A1* 1/2005 MacLennan ...... G06F 17/30539

2007/0069736 A1* 3/2007 Shrivastav .......... G06F 17/5036
  324/500
2011/0307437 A1* 12/2011 Aliferis ................ G06N 99/005
  706/52

OTHER PUBLICATIONS

McKinney et al. Features for Audio and Music Classification. In Proc. ISMIR, pp. 151-158, 2003.*
Talukdar et al. New Regularized Algorithms for Transductive Learning. Proceeding ECML PKDD '09 Proceedings of the European Conference on Machine Learning and Knowledge Discovery in Databases: Part II pp. 442-457. 2009.*
Tzanetakis et al. Musical Genre Classification of Audio Signals. IEEE Transactions on Speech and Audio Processing, vol. 10, No. 5, Jul. 2002.*
Wettschereck et al. Weighting Features. ICCBR 1995: Case-Based Reasoning Research and Development pp. 347-358 (Year: 1995).*
Baluja, Shumeet et al., Video Suggestion and Discovery for YouTube: Taking Random Walks Through the View Graph, Proceedings of the 17th International Conference on the World Wide Web, pp. 895-904, Apr. 24, 2008, 10 pages, Beijing, China.

* cited by examiner

*Primary Examiner* — Alexey Shmatov
*Assistant Examiner* — Robert Bejcek, II
(74) *Attorney, Agent, or Firm* — Thorpe North & Western, LLP

(57) ABSTRACT

A technology for propagating themes is provided. In one example, a method may include identifying media having a content feature contained in a presentation of the media. The method may include extracting the content feature of the media as a continuous variable and discretizing the continuous variable into a bucket representing a discrete value. A theme label may be applied to the media and may be propagated to other media with continuous variables discretized into the subset of buckets.

17 Claims, 7 Drawing Sheets

MEDIA THEME PROPAGATION USING DECRETIZATION OF CONTINUOUS VARIABLES

BACKGROUND

A large and growing population of people enjoy entertainment or digital media through consumption of digital content items, such as music, movies, books, games and other types of digital content. As more content is made available in digital form, the economic landscape for media creation, production, and distribution is evolving. Electronic distribution of information has gained in importance with the proliferation of personal computers, mobile devices and mobile phones, and electronic distribution has undergone a tremendous upsurge in popularity as the Internet has become widely available. With the widespread use of the Internet, it has become possible to quickly and inexpensively distribute large units of information using electronic technologies.

The rapid growth in the amount of digital media available provides enormous potential for users to find content of interest. Unfortunately, given the difficulty of searching digital media, the size of a digital media repository often makes the discovery of digital media a difficult task. One method of machine learning, Adsorption, provides a method of efficiently propagating information through a variety of graphs and has been applied to digital media to propagate preference information for personalized digital media recommendations.

Adsorption is a general method for transductive learning where the machine learner is often given a small set of labeled examples and a very large set of unlabeled examples. The goal is to label the unlabeled examples, and possibly under the assumption of label-noise, also to re-label the labeled examples. As many other related methods, Adsorption assumes that the learning problem is given in a graph form, where examples or instances are represented as nodes or vertices and edges code the similarity between examples. Some of the nodes are associated with a pre-specified label, which is correct in the noise-free case, or can be subject to label-noise. Additional information can be given in the form of weights over the labels. Adsorption propagates label-information from the labeled examples to the entire set of vertices via the edges. The labeling is represented using a non-negative score for each label, with a high score for some label indicating high-association of a vertex (or its corresponding instance) with that label. If the scores are additively normalized they can be thought of as a conditional distribution over the labels given the node (or example) identity.

DETAILED DESCRIPTION

A technology for propagating themes is provided. In one example, a method may include identifying media (e.g., audio or video programs) having a content feature contained in a presentation of the media. The method may include extracting the content feature of the media as a continuous variable and discretizing the continuous variable into a bucket representing a discrete value representing the feature. A theme label may be applied to the media and may be propagated to other media with continuous variables discretized into the bucket(s) for the feature.

In an example, the method may include identifying a digital music segment having an audio feature and extracting the audio feature (e.g., timbre) as a continuous variable. The method may include discretizing the continuous variable into a subset of discrete value buckets approximating the continuous variable. The buckets may be discrete values representing the extracted features and may be associated with a feature label. A theme label may be applied to the digital music. The theme label may be propagated to other digital music with continuous variables discretized into the subset of buckets for the feature(s) using Adsorption.

Figure 1A:
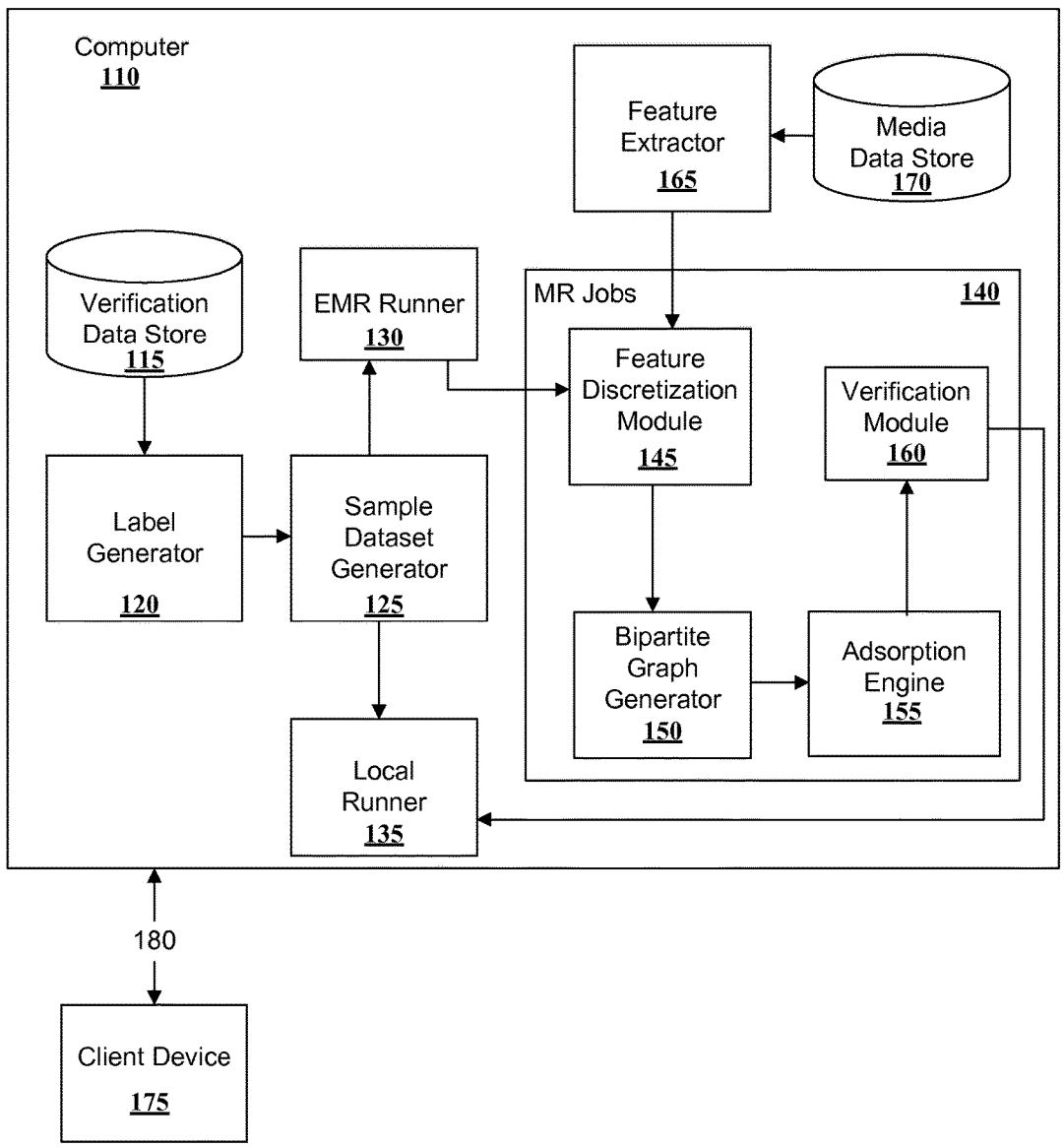
FIG. 1A is a schematic overview of a system for propagating media theme labels in accordance with an example of the present technology.

FIG. 1A illustrates an overview of a system for propagating themes in accordance with an example of the present technology. The system may be operated in a single or multi-tenant environment. The system may be operated on one or more computing devices 110, such as a single server environment or a clustered server environment.

As used herein, the term "theme" may be broadly interpreted. A theme may be a topic of discussion, a subject of artistic representation, an implicit or recurrent idea, or a motif, for example. A theme may be a broad category that subsumes and includes a sub-category of genre. For example, a genre may be a category of artistic composition marked by a distinctive style, form, or content. Any of a variety of themes may be identified for media. For example, themes for audio tracks may include themes such as: exercise, slow, meditation, Christian or holiday. Themes may be determined, for example, based on a timbre of the media.

The system may include a verification data store 115. The verification data store 115 may include a database of manually classified data results (e.g., classified nodes or vertices) used as training media for propagating theme labels. In other words, the data results may include media with associated themes. When the media is music or audio, the data results may include music tracks with the associated themes. The data in the verification data store 115 may be a training dataset. Because the data in the verification data store 115 may have been manually classified by an operator, the data may be used as a basis for generating additional themes. As will be described in additional detail later, the verification data store 115 may include features of the media, and the features may be associated with the labels. Identification of features of media to be labeled, followed by a comparison of the features of the training dataset and the features of the media to be labeled, may enable accurate labeling and theme propagation from the training dataset.

FIG. 1A further illustrates a verified label distribution generator or simply "label generator" 120. The label generator 120 may create a distribution for manually verified themes for the training dataset in the verification data store 115. The distribution may be a distribution of features for the various labels. In applying theme labels to unlabeled media, media with similar feature distributions may be labeled with similar labels.

A sample dataset generator 125 may take the training dataset and/or the distribution data from the verification data store 115 and/or the label generator 120 and split the data into a training set and a test set. For example, the training dataset may be split into ten portions with eight portions used for the training set and two portions used for verification of the test set. The training set may be sent to an EMR runner 130. Technology other than an EMR runner 130 may be used, but this example uses an EMR runner 130 for illustration purposes. An Elastic MapReduce (EMR) cluster and application may enable analysis and processing of large amounts of data. The EMR may distribute the computational work across a cluster of virtual servers running in a multi-tenant service provider environment, for example. The cluster may be managed using an open-source framework called Hadoop.

Hadoop uses a distributed processing architecture called MapReduce (MR) in which a task is mapped to a set of servers for processing. The results of the computation performed by those servers is then reduced down to a single output set. One node, designated as the master node, controls the distribution of tasks. The EMR runner 130 in FIG. 1A represents the master node controlling distribution of MR (map reduce) tasks or jobs. The jobs may be run in parallel across multiple different nodes (e.g., servers).

The test set data from the sample dataset generator 125 is compared at the local runner 135 or node (such as using N fold stratified cross-validation). A model that is built by the MR Jobs 140 module is compared to the test set to evaluate the accuracy of the model. This comparison may be performed using the output of MR Jobs 140. MR Jobs 140 may take the training data and discretize the training data (e.g., find features in the target media as continuous variables and bucketize the continuous variables) using the feature discretization module 145. For example, in the case of audio tracks, extraction of features from the audio tracks may result in a feature set of continuous variables associated with media segments (e.g., files). As will be described later, Adsorption may be used to propagate theme labels from the training data to unlabeled media segments, such as unlabeled audio or music tracks. The MR Jobs 140 module may thus also take features of unlabeled media from a feature extractor 165, which extracts features of media in the media data store 170 and the MR Jobs 140 module may process the unlabeled data through discretization, graph generation and Adsorption.

Adsorption has not been used for propagating continuous variables, but rather for propagating discrete values. Because the features extracted from the audio tracks include continuous variables, application of Adsorption to these values may result in a figurative explosion of vectors, providing a result which is not useful in propagating the theme labels. Use of discrete variables for Adsorption may thus be preferable.

As used herein, a "variable" may describe something that can be measured and can also vary. Variables can be grouped as either discrete or continuous variables. Discrete variables may have a certain number of different values between two given points. For example, in a family, there may be one, two, or three children, but there cannot be a continuous scale of 1.1, 1.5, or 1.75 children. Continuous variables may have an infinite number of different values between two given points, such as between the discrete values of 1 and 2. As a further example, discrete values may be specified as not representing decimals (e.g. 1.1, 1.5, 1.75) in a specific case.

Figure 1B:
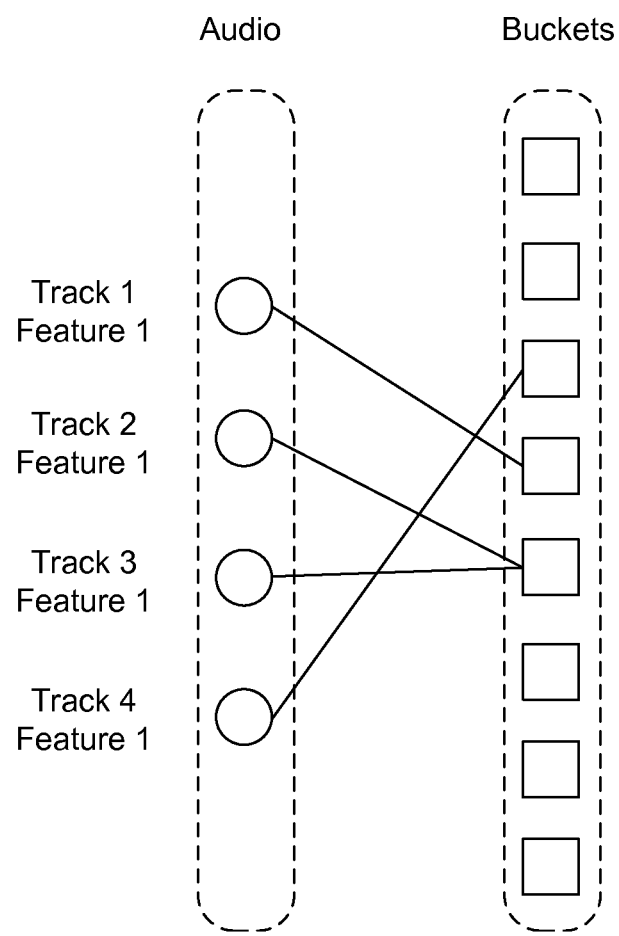
FIG. 1B is an illustration of a bipartite graph in accordance with an example of the present technology.

Because Adsorption is suited for use with discrete variables or values and media feature extraction may result in continuous variables, the feature discretization module may discretize (e.g., convert or map) the continuous variables into discrete values for use with Adsorption. A bipartite graph generator 150 may generate a bipartite graph based on the discretized values. In the mathematical field of graph theory, a bipartite graph (or bigraph) is a graph whose vertices can be divided into two disjoint sets U and V (that is, U and V are each independent sets) such that every edge connects a vertex in U to a vertex in V. FIG. 1B illustrates an example bipartite graph. One half of the graph may represent the audio tracks, or the features thereof, and the other half of the graph may represent buckets into which the discretized features may be placed. Each feature may be associated with a separate "set" of buckets. For example, a same feature from multiple different tracks may be associated with a same set of buckets while a different feature from a same track may be associated with a different set of buckets. FIG. 1B illustrates "Feature 1" of tracks 1-4 mapping to a set of buckets. A "feature 2" would map to a different set of buckets.

Adsorption is a machine learning algorithm that performs label propagation via statistical traversal of a bipartite graph. Adsorption is useful for classification problems, by starting with some truthful classification of sample items and spreading that to new items based on attributes that are shared between the items in the graph. In this model, one side of the bipartite graph is items, and the other side is attributes. The edges of the graph represent weighted connections between items and attributes. Some data that describes an item may not be defined in terms of discrete attributes, but instead in terms of a range of continuous numerical values. For example, all rectangles have a width and height, but those dimensions could be described by any numerical value. The granularity of those values would prevent you from establishing any graph relationship or weighting for the purposes of applying the Adsorption algorithm to those items.

The present technology describes a mechanism of segmenting a range of continuous values, and using the segments as attributes that can be connected in the bipartite graph using Adsorption. Using the rectangle example above, one solution would be to bucket all rectangles into either 'small' or 'large'. Each rectangle would be assigned only one of those two buckets, and then edges in the graph would be assigned based on that. More advanced solutions may split each continuous range into N quantiles based on the distribution of data points within the set. Weighting of the edges can be weighted as compared to constant values or include some measurement of distance from the center (mean or median) of any given range.

The present technology may use Adsorption to propagate themes to musical tracks, based on 124 dimensions of data that represent the timbre of the musical work. Each track may be given a floating-point value for each of the 124 dimensions, and the floating-point values may be bucketed into quantiles to find common features between tracks.

With continued reference to FIG. 1A, after generation of the bipartite graph using the bipartite graph generator 150, Adsorption may be applied using an Adsorption engine 155 to the resulting data to propagate theme labels. The results of the Adsorption, and a model resulting from the Adsorption, may be fed back to the local runner 135 to compare against the test set. This may be iterated a number of times. A model may be created for each iteration. A final model may be a best model from the iterations or may be a cumulative or combined model from the iterations.

A features data store (e.g., within media data store 170) may store, for each of the tracks to be labeled, the set of features extracted for those tracks. These tracks or features of tracks may be used in MR Jobs 140. The EMR runner 130 may build the model using MR Jobs 140 and the local runner 135 validates the model that is created using the verification module 160.

The system may include one or more data stores configured to store any of a variety of useful types and formats of data. For example, a data store may include a digital media data store (i.e., media data store 170). The digital media data store may include, for example, the digital media in a catalog, including labeled digital media and unlabeled digital media, as well as discretized digital media and undiscretized digital media. The digital media data store may include text, images, audio, video and so forth.

As used herein, a "graph" may refer to a representation of a set of objects where some pairs of objects are connected by links. The interconnected objects are represented by mathematical abstractions called vertices, and the links that connect some pairs of vertices are called edges. Typically, a graph is depicted in diagrammatic form as a set of dots for the vertices, joined by lines or curves for the edges.

As used herein, the term "data store" may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media.

A client device 175 may access the digital media, the Adsorption model or any other desired data via the computing device over a network. Example client devices 175 may include, but are not limited to, a desktop computer, a laptop, a tablet, a mobile device, a television, a set-top box, a cell phone, a smart phone, a hand held messaging device, a personal data assistant, an electronic book reader, heads up display (HUD) glasses, an in-vehicle computer system, or any device with a display that may receive and present the digital media. The network may be representative of any one or combination of multiple different types of networks, such as the Internet, cable networks, cellular networks, wireless networks (e.g., Wi-Fi, cellular, etc.), wired networks and the like.

The system may be implemented across one or more computing device(s) 110 connected via a network 180. For example, a computing device may include a data store and various engines and/or modules such as those described above and such modules may be executable by a processor of the computing device. The system may be implemented as a plurality of computing nodes, each of which comprises at least one processor and a memory, where the computing nodes are configured to collectively implement the modules, data stores and so forth.

The modules that have been described may be stored on, accessed by, accessed through, or executed by a computing device. The computing device may comprise, for example, a server computer or any other system providing computing capability. Alternatively, a plurality of computing devices may be employed that are arranged, for example, in one or more server banks, blade servers or other arrangements. For example, a plurality of computing devices together may comprise a clustered computing resource, a grid computing resource, and/or any other distributed computing arrangement. Such computing devices may be located in a single installation or may be distributed among many different geographical locations. For purposes of convenience, the computing device is referred to herein in the singular form. Even though the computing device is referred to in the singular form, however, it is understood that a plurality of computing devices may be employed in the various arrangements described above.

Various applications and/or other functionality may be executed in the computing device according to various embodiments, which applications and/or functionality may be represented at least in part by the modules that have been described. Also, various data may be stored in a data store that is accessible to the computing device. The data store may be representative of a plurality of data stores as may be appreciated. The data stored in the data store, for example, may be associated with the operation of the various applications and/or functional entities described. The components executed on the computing device may include the modules described, as well as various other applications, services, processes, systems, engines or functionality not discussed in detail herein.

Although a specific structure may be described herein that defines server-side roles (e.g., of content delivery service) and client-side roles (e.g., of the content access application), it is understood that various functions may be performed at the server side or the client side.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

Figure 2:
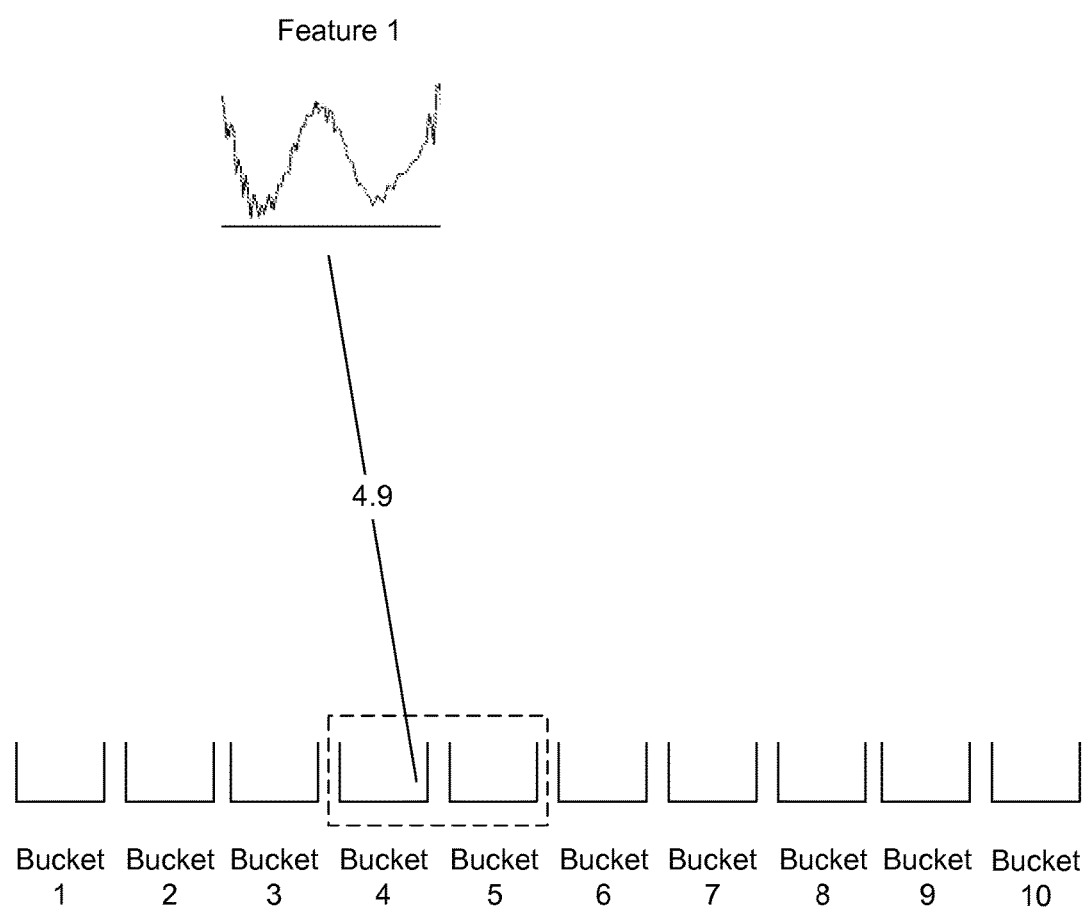
FIG. 2 illustrates bucketization of continuous variables into a plurality of buckets in accordance with an example of the present technology.

Reference will now be made to FIG. 2. As described previously, Adsorption conventionally utilizes discrete values to avoid an unmanageable and less useful large numbers of feature vectors. One way to make continuous variables discrete is by using buckets. Before discretizing or bucketing continuous variables, the values of the variables may be normalized. For example, the values for each of the features may be normalized to a value between 0 and 1. This technique is commonly referred to as feature scaling or unity normalization. Using variable E as an example, the normalized value of $e_i$ for variable E in the $i^{th}$ row is calculated as:

$$\text{Normalized}(e_i) = \frac{e_i - E_{min}}{E_{max} - E_{min}}$$

Where $E_{min}$=the minimum value for variable E, $E_{max}$=the maximum value for variable E, and if $E_{max}$ is equal to $E_{min}$ then Normalized ($e_i$) is set to 0.5. Other methods of normalization may also be used.

A number of buckets to use for discretization may be determined as desired. For example, when using ten buckets for label propagation, the features may be discretized into ten even slices. Whichever bucket the feature maps to, then corresponds to the feature label that will be assigned to the track. Feature labels may be labels representing features of the track. The collective feature labels for an individual track may be used to determine theme labels to apply to the track. The system may assign a feature within an individual bucket or within a plurality of buckets. For example, as shown in FIG. 2, a feature may be discretized to a plurality of buckets. The plurality of buckets may include the bucket within which the feature lands and also the nearest adjacent bucket. Use of the nearest adjacent bucket in addition to the bucket in which the feature lands may assist with issues that arise when the feature lands on or near a bucket boundary. When the feature lands near a bucket boundary, an assumption may be made that there is a connection between the two feature values. In some examples, two buckets may be used for each feature. In other examples, two buckets may be used for features near a bucket boundary according to a predetermined boundary proximity threshold, but a single bucket may be used for features outside of the predetermined boundary proximity threshold. In yet further examples, a single bucket may be used for each feature regardless of proximity to bucket boundary. In still further examples, more than two buckets may be used for each feature.

Figure 3:
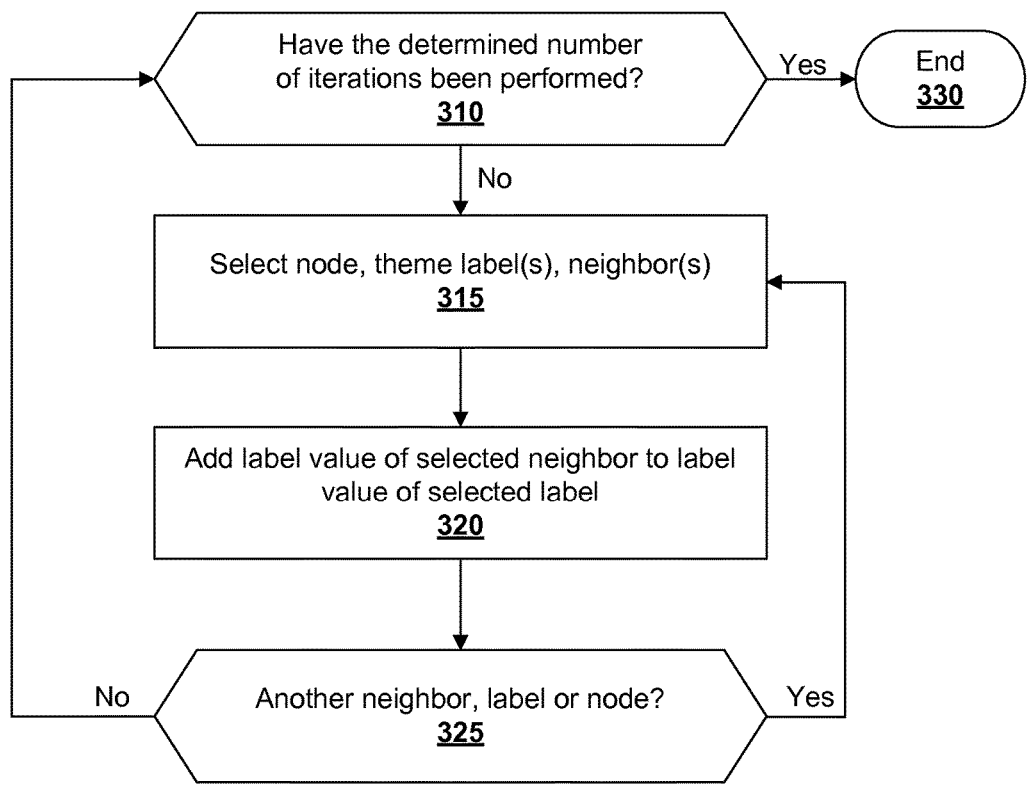
FIG. 3 is a diagram of an Adsorption method.

Reference will now be made to FIG. 3. FIG. 3 illustrates a flow diagram of a method for applying Adsorption machine learning and for inferring theme labels based on theme labels of neighboring nodes. The Adsorption process may begin with determining 310 whether a specified number of iterations have run for a bipartite graph. If the number of expected iterations have not be reached, a next step in the method may be performed. For example, a node may be selected 315 that has theme label values. A label may be selected from the selected node. A label value for the selected label may be initialized to zero.

A neighboring node of the selected node can be selected (also indicated at 315). For example, the selected node may specify that a second audio track is related to a first audio track or shares a similar bucket for a feature. A corresponding weighted label value of a selected neighbor may be added 320 to a label value of the selected label. For example, if the second audio track has a feature corresponding to a feature label of the first audio track, the feature label of the first audio track may be added to the selected node's label value for the feature of the second audio track. In certain implementations, the label value retrieved from a neighboring node may be weighted to affect the contribution of the label value based on a degree of distance from the selected node (e.g., based on whether the neighboring node is linked directly to the selected node, linked by two edges to the selected node, etc.) The label value may also be based on a weight associated with the edge. For example, the edge weight may reflect an explicit association between two nodes.

A determination 325 may be made as to whether there is another neighbor node to select. For a determination may be made as to whether the selected node is linked by a single edge to any additional neighbors that have not been selected. In another example, a user may specify how many degrees out (e.g., linked by two edges, three edges, etc.) to search for neighboring nodes.

If each of the labels in the node have been selected, the label values of the selected node can be normalized to have a value between 0 and 1, where the label value's magnitude is proportional to its contribution relative to each of the label values associated with that node.

If there are additional nodes in the graph to select, the method can return to 315. If each of the nodes in the graph have been selected, the method may determine 310 whether the specified number of iterations has been performed on the graph. Once the specified number of iterations has been reached, the Adsorption may be complete 330.

Any of a variety of feature extraction technologies may be used to extract continuous variable features from media. Marsyas is an example technology that is open source and which is designed to extract timbre features from audio tracks. Marsyas is a software framework for rapid audio analysis and synthesis with specific emphasis to music signals and music information retrieval. The technology provides a general, extensible and flexible architecture that provides fast performance that is useful in developing real time audio analysis and synthesis tools. There are a significant number of programming languages, frameworks and environments for the analysis and synthesis of audio signals. The processing of audio signals involves extensive numerical calculations over large amounts of data especially when real-time performance is desired. Therefore efficiency has always been a major concern in the design of audio analysis and synthesis systems.

The timbre of the media may represent sound qualities of the audio tracks that may not necessarily be classifiable into categories typically considered for music or audio. The features may be classified by Marsyas into a range of values. For example, Marsyas may take the waveform of the audio track and break the waveform down into 124 continuous variables, or 124 dimensions, that may not necessarily be tied to a particular language analog. Consideration of the features in combination may assist in identifying an analog, such as that a particular combination indicates a sound of a violin in the track. The continuous variables or features may be in the form of numbers. The numbers may be discretized into the buckets. The output of the buckets may be new feature labels for the audio track(s) based on the buckets.

The Adsorption algorithm propagates the theme labels to other tracks having similar bucketized features. Each feature may be assigned to one or more buckets. Whether the feature exists for a track or not may be determined. The system may create a bipartite graph where feature labels connect to theme labels. Labeled tracks have themes that have features in the bipartite graph. One half of the graph may represent the audio tracks and the other half may be the buckets or discretized values. Using the dataset that is labeled manually, theme labels may be propagated to other tracks that are mapped to buckets representing the features.

Other features may be extracted from audio waveforms, such as specifically targeting melody, harmony, key, rhythm, beats, dynamics, tempo, or other values of the audio. In some instances, it may be useful to subsample bucketization down to a smaller number of buckets. For example, a tempo may be 122.5 beats per minute (bpm), which may be discretizable to 122 beats per minute. However, a difference between, for example, 119, 120, 121 beats per minute may not be that large or significant. Sub-sampling the values to a smaller number of buckets may result in grouping the values with insignificant differences together in a single bucket or in multiple buckets, such as into a 110 bpm bucket and a 120 bpm bucket, each with a range of +10 bpm.

The present technology may also be applied to other types of media besides music. For example, the technology may be applied to video. If an appropriate feature is identified, a similar process of continuous variable feature identification, followed by discretization and propagation may be used to propagate labels across videos. Audio, color, lighting, photographic shot change speed, etc. may be example continuous values from which a mood or theme of the video may be determined.

Another example application is with text. A readability function, for example, may consider text in a sentence by sentence manner and return continuous values representing readability. In another example, a positive, neutral or negative sentiment value may be assigned to a paragraph. For example, −1 may represent 'angry', +1 may represent 'happy' and the spectrum in between angry and happy may be where the continuous values lie. Any kind of value that can extracted as a continuous variable may be bucketized into discrete values and then propagated to other media using Adsorption. While much of the discussion herein relates primarily to the discretization of continuous variables, it will be appreciated that theme propagation may be performed for variables that are extracted as discrete variables rather than continuous variables.

Dataflow programming is based on the idea of expressing computation as a network of processing nodes/components connected by a number of communication channels/arcs. Expressing audio processing systems as dataflow networks has several advantages. The programmer can provide a declarative specification of what to compute without having to worry about the low level implementation details. The resulting code can be very efficient and have low memory requirements as data simply "flows" through the network without having complicated dependencies. In addition, dataflow approaches are particularly suited for visual programming. Dataflow systems may be particularly suited for parallel and distributed computation.

Figure 4:
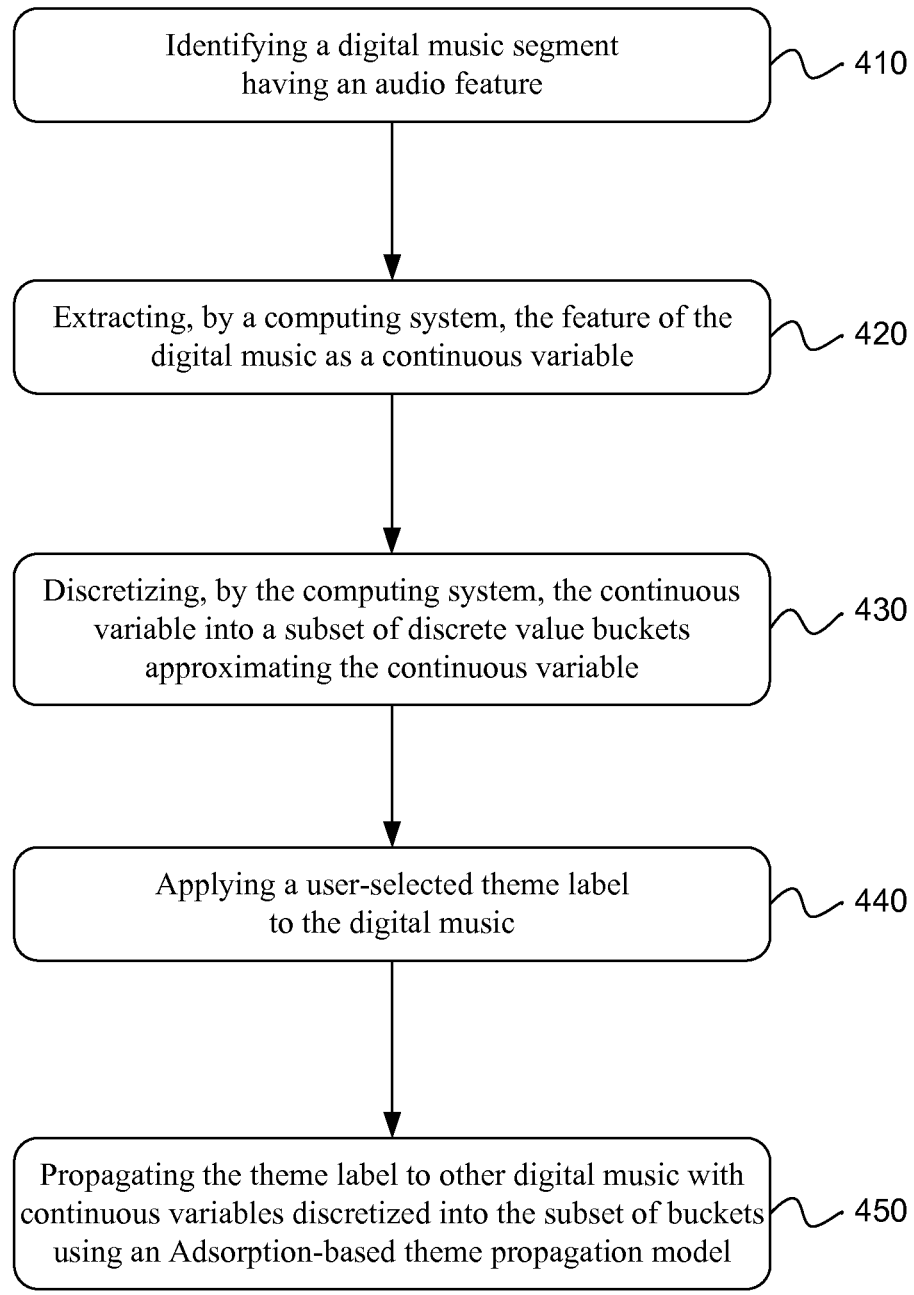
FIGS. 4-5 are flow diagrams for methods of propagating media theme labels in accordance with examples of the present technology.
Figure 5:
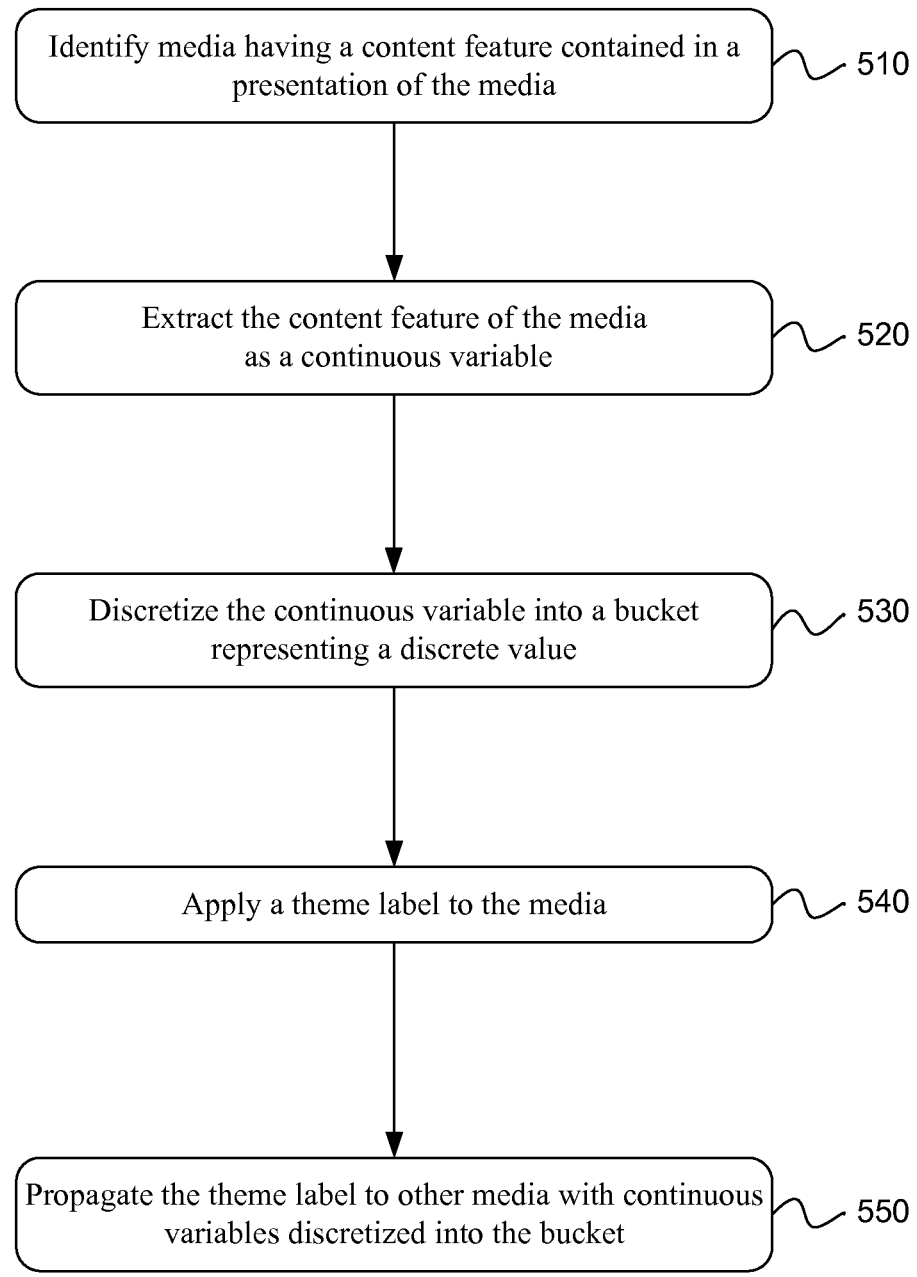

FIGS. 4-5 illustrate flow diagrams of methods according to the present technology. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Additional example details, operations, options, variations, etc. that may be part of the method have been described previously herein and/or are described in further detail below. Various systems, devices, components, modules and so forth for implementing the method may also be used, as described with respect to the various examples included in this disclosure.

Referring now to FIG. 4, a flow diagram of a method for propagating themes is illustrated in accordance with an example of the present technology. The method may include identifying 410 a digital music segment having an audio feature and extracting 420 the audio feature as a continuous variable. The method may include discretizing 430 the continuous variable into a subset of discrete value buckets approximating the continuous variable. A theme label may be applied 440 to the digital music. For example, the theme label may be manually selected by a user, expert or domain expert. Digital music with manually selected theme labels may serve as a training dataset for propagation to other unlabeled digital music based on the discrete value(s) associated with the digital music. The unlabeled digital music may be correlated digital music with manually selected theme labels via the buckets. A determination may be made based on the correlation whether to apply the manually selected theme labels to the unlabeled digital music and to which of the unlabeled digital music tracks to apply the theme labels. The theme label may be propagated 450 to other digital music with continuous variables discretized into the subset of buckets using an Adsorption-based theme propagation model.

In one example, the method may include using a bipartite graph to map known theme labels from training data to the digital music segment based on the features and using Adsorption machine learning. For example, the bipartite graph may represent the features of the digital music segment and the buckets of the discrete values for the features. Correlation of the training data and the digital music segment for a particular feature may be used to propagate a feature label. Combinations of feature labels may be used to identify a theme label for the digital music segment. In other words, propagation of theme labels may be accomplished by using feature labels. In another example, theme labels may be applied directly based on the distribution of features in the buckets and the correlation of the distribution of the digital music segment and the training data.

In one example, the continuous variable may include a decimal value or group of decimal values (e.g., audio samples). The continuous variable may be a variable within a range from 0 to 1. In another example, the continuous variable may be normalized to a range of from 0 to 1. Discretizing 430 the continuous variable into a subset of discrete value buckets approximating the continuous variable may include multiple steps of discretizing the continuous variable and then assigning the continuous variable to one or more suitable buckets based on the discrete value. Normalization may be performed before or after discretization or before or after bucketing of discretized continuous variables.

Marsyas or any other suitable feature extraction technology may be used to extract a desired feature from the digital music segment. Some such features may not be individually readily recognizable by a human, but may be recognizable in combination with other features. In some examples, the features may be readily recognizable either individually or in combination with other features and may include, for example, a melody or harmony of the digital music segment, a mood of the digital music segment, instruments or voices in the digital music segment and so forth.

Propagation of the theme labels may be performed using machine learning. One specific example of machine learning discussed herein is Adsorption. Machine learning may take empirical data as input, such as data from the training data set, and may yield patterns or new linking rules (e.g., predictions) which may be representative of the underlying mechanism, user thought or interaction process that resulted in the generation of the data. Machine learning systems may take advantage of data to capture characteristics of interest having an unknown underlying probability distribution. Machine learning may be used to identify possible relations between observed variables, such as aspects of user interaction with respect to orders, devices and so forth. Machine learning may also be used to recognize complex patterns and make machine decisions based on input data. In some examples, machine learning systems may generalize from the available data to produce a useful output, such as when the amount of available data is too large to be used efficiently or practically.

Referring now to FIG. 5, a flow diagram of a method for propagating themes is illustrated in accordance with an example of the present technology. The method may include identifying 510 media having a content feature contained in a presentation of the media. The method may include extracting 520 the content feature of the media as a continuous variable and discretizing 530 the continuous variable into a bucket representing a discrete value. A theme label may be applied 540 to the media and may be propagated 550 to other media with continuous variables discretized into the subset of buckets.

The method may include identifying the theme label to apply to the media from training media having the feature. The method may include performing theme validation to validate that tracks are correctly tagged to the proper themes. This process of theme validation may be used to generate a learning dataset to then further categorize the remaining tracks in the digital media catalog to the same set of themes. As discussed previously, a theme can be a genre, but may also be any other suitable categorization of media, such as a "workout" theme. Themes may optionally be loosely based on genre or sub-genre, but may be expanded beyond genre or sub-genre.

The method may include generating a graph, such as a bipartite graph, linking features and buckets or discrete values for the media items, the buckets representing discretized continuous variables. The method may include propagating the theme label from labeled media to unlabeled media when the unlabeled media has the feature(s) of the labeled media.

Features may be extractable from each media item. For example, 124 different features may be extracted from each media item. Each of the features may be represented by a continuous variable. Each of the continuous variables may be discretized into a number of buckets, such as into ten buckets. Each bucketization of the discretized continuous variables may result in placement of the discrete variables in one or multiple buckets. The one or more buckets may include buckets closely approximating the continuous variable. For example, where the value is proximal to a bucket boundary, the use of multiple buckets may result in a more accurate characterization of the feature because the feature may be represented by both buckets proximal to the boundary.

The method may include analyzing a waveform of the media to extract the feature(s) of the media as the continuous variable(s). In one example, analyzing the waveform may include analyzing the waveform using Music Analysis, Retrieval and Synthesis for Audio Signals (Marsyas).

The method may include forming a bipartite graph including the media and training media. The bipartite graph may be a graph of relationships between the media and training media based on features. In another example, separate bipartite graphs may be generated for the media and training media, correlating the features with the labels. The media may include digital music, audio, video, text or any other suitable form, type or format of media, such as digital media.

The method may include performing machine learning to improve application of the theme label based on the bucket. The machine learning described primarily herein is Adsorption. However, other types of machine learning may also be applied to learn a model and propagate theme labels based on features expressed as continuous variables. For example, any of a variety of graph-based semi-supervised learning (SSL) technologies may be used, some examples of which include Gaussian Random Fields (GRF), Adsorption, and Modified Adsorption (MAD).

The method may include performing data normalization. Because music features from Marsyas may take different scales and Adsorption may take the linear combination of each feature to propagate the label distribution, in order to put equal weights on any single feature, normalization may be used. For each feature, the feature may be standardized to zero mean with unit variance (fmean: mean of the feature of the sample, fstd: std of the feature of the sample). If some single feature is known to have greater importance, a scaling factor may be used to place more weight on this feature.

$$f=(f-fmean)/fstd$$

fmean, fstd may be calculated based on a sample size, and serve as the lookup table during input generation phase to fully construct the bipartite graph. It may be unnecessary to seek global mean & std when using a sufficiently large sample size and computing complexity to get a good std using distributed algorithm. fmean, fstd for all 124 features may be exported as a lookup file for a MapReduce Job.

The method may include performing feature discretization, as has been described. Some additional details will now be provided. In a conventional Adsorption implementation, feature nodes share connections from data nodes due to their similarity (e.g., a movie may share a connection from two users that both watched the movie). This setup allows the continuous propagation of a multiple level connection which helps to give a better label distribution for the data nodes through similarity. As applied to, for example, a library of digital music, each of the 124 features may be fully connected to all of the data nodes (songs), such as 27 million songs, which means that any song will get the label distribution of the other songs as whole. Discretization is used to address this issue. By graphing a random feature distribution, the graph illustrates that the data is not uniformly distributed, and thus a quantile approach may be used. In one example, for each feature, values may be sorted and divided into 20 buckets evenly.

Similarly as mentioned in the description of the method illustrated in FIG. 4, additional example details, operations, options, variations, etc. that may be part of the method illustrated in FIG. 5 have been described previously herein and/or are described in further detail below. Various systems, devices, components, modules and so forth for implementing the method may also be used, as described with respect to the various examples included in this disclosure.

Figure 6:
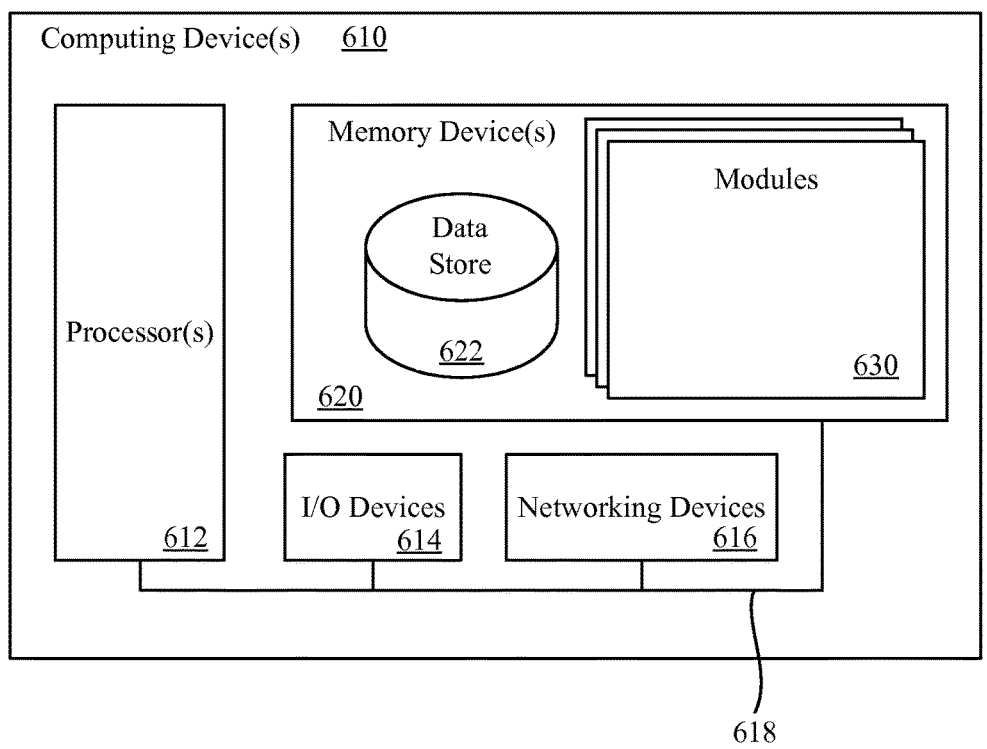
FIG. 6 is a block diagram of a computing system for propagating media theme labels in accordance with an example of the present technology.

FIG. 6 illustrates a computing device 610 on which services or modules of this technology may execute. A computing device 610 is illustrated on which a high level example of the technology may be executed. The computing device 610 may include one or more processors 612 that are in communication with memory devices 620. The computing device 610 may include a local communication interface 618 for the components in the computing device. For example, the local communication interface 618 may be a local data bus and/or any related address or control busses as may be desired.

The memory device 620 may contain modules that are executable by the processor(s) and data for the modules. A data store 622 may also be located in the memory device 620 for storing data related to the modules and other applications along with an operating system that is executable by the processor(s) 612.

The computing device 610 may further include or be in communication with a client device 630, which may include a display device. The client device 630 may be available for an administrator to use in interfacing with the computing device 610, such as to review or make improvements to machine learning models or linked data and so forth.

Various applications may be stored in the memory device 620 and may be executable by the processor(s) 612. Components or modules discussed in this description that may be implemented in the form of software using high programming level languages that are compiled, interpreted or executed using a hybrid of the methods.

The computing device 610 may also have access to I/O (input/output) devices 614 that are usable by the computing devices. An example of an I/O device 614 is a display screen that is available to display output from the computing devices. Other known I/O device may be used with the computing device as desired. Networking devices 616 and similar communication devices may be included in the computing device 610. The networking devices 616 may be wired or wireless networking devices 616 that connect to the internet, a LAN, WAN, or other computing network.

The components or modules that are shown as being stored in the memory device 620 may be executed by the processor 612. The term "executable" may mean a program file that is in a form that may be executed by a processor 612. For example, a program in a higher level language may be compiled into machine code in a format that may be loaded into a random access portion of the memory device 620 and executed by the processor 612, or source code may be loaded by another executable program and interpreted to generate instructions in a random access portion of the memory to be executed by a processor 612. The executable program may be stored in any portion or component of the memory device 620. For example, the memory device 620 may be random access memory (RAM), read only memory (ROM), flash memory, a solid state drive, memory card, a hard drive, optical disk, floppy disk, magnetic tape, or any other memory components.

The processor 612 may represent multiple processors and the memory 620 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

The invention claimed is:

1. A computer-implemented method for propagating themes, comprising:
    identifying a digital music segment in a media data store having an audio feature;
    extracting, by a computing system, the audio feature of the digital music segment as a continuous variable normalized within a range from 0 to 1 and having a scaling factor which varies between audio features, and a magnitude of the continuous variable within the range being proportional to a contribution of the continuous variable to a user-selected theme label to be applied to the digital music;
    discretizing in a MapReduce job, by the computing system, the continuous variable extracted from the digital music segment into a subset of discrete value buckets representing the continuous variable;
    applying the user-selected theme label to the digital music; and
    propagating the theme label to other digital music with continuous variables discretized into the subset of buckets using an Adsorption-based theme propagation model;
    validating that the user-selected theme label propagated to other digital music is associated with a pre-specified label using a MapReduce runner;
    generating a learning dataset having a defined set of themes based on the validating; and
    categorizing unlabeled digital media in a digital media catalog to the set of themes using the learning dataset.

2. The method of claim 1, further comprising using a bipartite graph to map known theme labels from training data to the digital music segment using the audio feature and Adsorption machine learning.

3. The method of claim 1, wherein the audio feature is extracted from a timbre of the digital music.

4. A computing device that is configured to facilitate propagation of themes, comprising:
    a processor;
    a memory in electronic communication with the processor;
    instructions stored in the memory, the instructions being executable by the processor to perform a method, comprising:
    identifying media in a media data store having a content feature contained in a presentation of the media;
    extracting the content feature of the media as a continuous variable normalized within a range from 0 to 1, a magnitude of the continuous variable within the range being proportional to a contribution of the continuous variable to a theme label to be applied to the media;
    discretizing the continuous variable into a bucket representing a discrete value, using a MapReduce job;
    applying the theme label to the media; and
    propagating the theme label to other media with continuous variables discretized into the bucket;
    validating that the user-selected theme label propagated to other digital music is associated with a pre-specified label using a MapReduce runner;
    generating a learning dataset having a defined set of themes based on the validating; and
    categorizing unlabeled digital media in a digital media catalog to the set of themes using the learning dataset.

5. The method of claim 4, further comprising identifying the theme label to apply to the media from training media having the content feature.

6. The method of claim 4, further comprising generating a bipartite graph linking the content feature and the bucket for the media, the bucket representing a discretized continuous variable.

7. The method of claim 4, further comprising discretizing the continuous variable into a plurality of buckets when the continuous variable is within a predetermined boundary proximity threshold to a boundary between the plurality of buckets, and discretizing the continuous variable into a single bucket when the continuous variable is outside the predetermined boundary proximity threshold.

8. The method of claim 7, wherein the plurality of buckets include buckets representing the continuous variable.

9. The method of claim 4, further comprising analyzing a waveform of the media to extract the content feature as the continuous variable.

10. The method of claim 9, wherein the media comprises digital music.

11. The method of claim 4, further comprising forming a bipartite graph including the media and training media.

12. The method of claim 4, wherein the media is digital music.

13. The method of claim 4, wherein the media comprises at least one of audio, video or text media.

14. The method of claim 4, further comprising performing Adsorption to propagate the theme label from the bucket.

15. A non-transitory computer-readable medium comprising computer-executable instructions which, when executed by a processor, implement a system, comprising:
    a training data store storing a training dataset having a defined set of themes to apply theme labels to unlabeled music;
    a media data store storing the unlabeled music;
    a feature extractor configured to extract a feature from the unlabeled music as a continuous variable normalized within a range from 0 to 1 and having a scaling factor which varies between audio features;

a feature discretizer in a MapReduce job configured to discretize the continuous variable into a bucket as a discrete value; and a label generator configured to use Adsorption machine learning to generate and propagate theme labels for the unlabeled music based on the discrete value in the bucket for the unlabeled music; validate that the user-selected theme label propagated to other digital music is associated with a pre-specified label using a MapReduce runner; and categorize the unlabeled music in a digital media catalog to the set of themes based on the validating.

16. The system of claim 15, further comprising a graph generator to generate a bipartite graph for the training dataset and the unlabeled music.

17. The system of claim 15, further comprising an Adsorption propagation engine to propagate the theme labels to additional unlabeled music using the feature for the unlabeled music.

* * * * *